United States Patent [19]
Uebelhart et al.

[11] 3,923,706
[45] Dec. 2, 1975

[54] PROCESS FOR PREPARING SELF-EXTINGUISHING EXPANDABLE POLYSTYRENE

[75] Inventors: James J. Uebelhart, Beaver; John P. Spicuzza, Jr., Pittsburgh; Frank J. E. Mills, Beaver, all of Pa.

[73] Assignee: Arco Polymers, Inc., Philadelphia, Pa.

[22] Filed: Nov. 18, 1974

[21] Appl. No.: 524,423

Related U.S. Application Data

[63] Continuation-in-part of Ser. No. 377,748, July 9, 1973, abandoned.

[52] U.S. Cl. ..... 260/2.5 B; 260/2.5 FP; 260/45.7 R; 260/93.5 A; 260/93.5 W; 260/DIG. 24
[51] Int. Cl.² ............................................. C08J 9/00
[58] Field of Search ........ 260/2.5 B, 2.5 FP, 45.7 R, 260/93.5 A, 93.5 W

[56] References Cited
UNITED STATES PATENTS

| | | | |
|---|---|---|---|
| 3,058,926 | 10/1962 | Eichhorn | 260/2.5 FP |
| 3,192,169 | 6/1965 | Doak | 260/2.5 B |
| 3,265,643 | 8/1966 | Hatano et al. | 260/2.5 B |
| 3,274,133 | 9/1966 | Ingram | 260/2.5 FP |
| 3,338,864 | 8/1967 | Mageli et al. | 260/2.5 FP |

*Primary Examiner*—Richard B. Turer
*Attorney, Agent, or Firm*—Lewis J. Young

[57] ABSTRACT

Polystyrene prepared in aqueous suspension is rendered self-extinguishing by adding pentabromochlorocyclohexane to the polymerizing monomer after about 92% conversion of monomer to polymer. The halo-compound is incorporated into the polystyrene by chain-transfer. Simultaneous addition of blowing agent produces a self-extinguishing, expandable polystyrene.

1 Claim, No Drawings

PROCESS FOR PREPARING SELF-EXTINGUISHING EXPANDABLE POLYSTYRENE

CROSS-REFERENCE TO RELATED APPLICATIONS

This application is a continuation-in-part of copending application Ser. No. 377,748, filed July 9, 1973, now abandoned.

BACKGROUND OF THE INVENTION

This invention relates to a method of preparing self-extinguishing expandable polystyrene.

It is known to render polystyrene self-extinguishing by the addition of organic halogen-containing compounds. When pentabromochlorocyclohexane is incorporated into the polymer, for example, by adding the halogen compound during the hard bead impregnation with a blowing agent, the polystyrene becomes heat sensitive. Addition of the pentabromochlorocyclohexane to the monomer mixture prior to polymerization in, for example, an aqueous suspension polymerization, interfers with the polymerization of the styrene and results in the formation of a lower molecular weight polystyrene.

SUMMARY OF THE INVENTION

It has now been found that a heat-stable, self-extinguishing expandable polystyrene can be produced by polymerizing styrene in an aqueous suspension until between 92 and 98% of the monomer is converted to polymer, adding the pentabromochlorocyclohexane and the blowing agent to the suspension, and then continuing the polymerization to complete conversion. The halogen-compound is apparently incorporated into the polystyrene chains by a chain transfer reaction.

DETAILED DESCRIPTION OF THE INVENTION

Polymerizing styrene in an aqueous suspension is a well-known operation. The styrene and a free-radical initiator in the form of an oil phase are admixed with water and heated. The mixture is stirred or agitated so that the oil phase is in the form of small individual droplets. After the polymerization has progressed to a certain point, the droplets tend to become sticky so that stirring alone is insufficient to keep the droplets from coalescing. It is, therefore, necessary to use a suspending agent in the polymerization mixture. Examples of suitable suspending agents are polyvinyl alcohol, hydroxyethyl cellulose, and a mixture of tricalcium phosphate and an anionic surfactant.

The temperature for the polymerization must be high enough so that the polymerization occurs at a reasonable rate, with the preferred temperature range being between 70° and 120°C.

Typical radical initiators are the oil soluble peroxides, such as benzoyl peroxide, lauroyl peroxide, and t-butyl perbenzoate, and azobisisobutyronitrile.

In accordance with this invention, when the polymerization has reached a point between about 92 and 98 percent conversion of the styrene to polystyrene, a mixture of pentabromochlorocyclohexane, blowing agent, and additional initiator is added to the suspension and the polymerization then continued to essentially complete conversion.

The addition of the bromo-compound prior to the completion of the polymerization of the styrene allows the bromo-compound to be chemically combined with the growing polymer chains. As a result, the bromo-compound is not extractable from the completed polymer.

The pentabromochlorocyclohexane is useful in quantities between 0.5 and 5.0 percent by weight based on styrene monomer. Less than 0.5 percent of the halogen compound does not provide a self-extinguishing polymer. Greater than 5.0 percent may be used but does not appear to be necessary to impart self-extinguishing properties to the polymer.

The blowing agents are compounds which are gases or are normally liquid, but will produce gases on heating. Preferred blowing agents include aliphatic hydrocarbons containing from 1–7 carbon atoms in the molecule, for example, petroleum ether or methane, ethane, propane butane, pentane, hexane, heptane, cyclohexane, isopentane, and their halogenated derivatives which boil at a temperature below the softening point of the polymer. The agents are normally used in amounts between 5 and 15 percent by weight of the polymer particles.

The invention is further illustrated by the following Examples.

EXAMPLE I

To a suitable reactor equipped with a stirrer was added 100 parts of water, 0.64 parts of tricalcium phosphate and 0.0048 parts of sodium dodecylbenzene sulfonate. The system was purged with nitrogen. There was then added 100 parts of styrene containing 0.37 parts of benzoyl peroxide and 0.10 parts of t-butyl perbenzonate. The mixture was heated to 90°C. over a period of about 1 hour, with agitation, and maintained at 90°C. for approximately 5 hours or until approximately 92–95% conversion, as determined by sample. There was then added 0.5 parts of pentabromochlorocyclohexane, 0.35 parts of 2,5-dimethyl-2,5-di(tert-butylperoxy) hexane, and 9.0 parts of n-pentane. The temperature of the mixture was then raised to 110°C. and kept at that temperature for 6 hours to completely polymerize the remaining monomer. The polymer particles were recovered from the polymerization mixture, washed and dried.

A control sample was made by the identical process, omitting the halogen compound from the impregnation and completion step.

The polystyrenes from the control and that prepared by the method of this invention were essentially equal in molecular weight.

Foam strips of about 1.25 pound per cubic foot density were molded from the two samples of expandable beads and were tested for self-extinguishing properties by holding the strips in a vertical position and applying a flame to the lower end. On removing the flame, the strips from the control sample continued to burn, whereas the strip from the sample containing the halogen compound extinguished the flame in less than 2 seconds.

The pentabromochlorocyclohexane could not be leached away from the polystyrene sample — indicating the compound was chemically incorporated into the polymer chains.

EXAMPLE II

The procedure of Example I was repeated using 0.10, 0.20, 0.30, 0.50, 1.0, 3.0, and 5.0 parts of pentabromochlorocyclohexane in the impregnation step. The resulting expandable beads were molded into foam strips having densities of less than 1.5 pounds per cubic foot. Foams containing less than 0.5 parts of the halogen compound per 100 parts of polystyrene were completely burned when tested in the vertical strip test. Those foams containing 0.5 or more of the halogen compound were self extinguishing.

EXAMPLE III

In order to show that the instant process differs from the procedure of Eichhorn, U.S. Pat. 3,058,926, the process of Example 8 of the Eichhorn patent was duplicated as follows: A charge of 100 g. of styrene, 0.225% by weight of benzoyl peroxide, and 6.4% of a commercial grade of pentane was placed in a pressure resistant vessel in admixture with an equal weight of an aqueous solution of 1% polyvinyl alcohol as suspending agent. The mixture was stirred and was heated in the closed vessel to polymerize the monomer under time and temperature conditions as follows: 16 hours at 82°C.; 2 hours at 98°C.; and 6 hours at 120°C. Thereafter, the mixture was cooled to 95°C. A solution of 10 ml. of water containing 1% by weight of methyl cellulose, and a solution of 3.0% of the pentane, 1.1% of pentabromochlorocyclohexane, and 0.4% of dicumyl peroxide were added to the vessel. The resulting mixture was stirred and maintained at a temperature of 95°C. for 2 hours and then cooled to 20°C. The polymer beads were separated from the aqueous liquid and were washed and dried. The dried polymer was extracted with a mixture of methanol and n-pentane and the extract analyzed for bromo-compound. The bromo-compound was found to be present, to a great extent, in the extract, indicating that the bromo-compound did not combine chemically with the polystyrene, and further indicating that the styrene was polymerized to greater than 98% conversion by the initial polymerization schedule. Since the process of this invention gave a polystyrene having the bromo-compound chemically combined in the polymer, the two processes are not the same.

A repeat of the above process, using 0.4 g. of tricalcium phosphate and 32 ml. of a 0.01% aqueous solution of sodium bisulfite in place of the polyvinyl alcohol as suspending agent, gave the same results. The bromo-compound appeared to a substantial degree in the extract.

The sodium salt of sulfonated polyvinyltoluene used as suspending agent in the U.S. Pat. 3,058,926 could not be found in commercial sources. There is no reason to believe that the nature of the suspending agent would affect the results.

EXAMPLE IV

To illustrate the fact that the impregnation of polystyrene polymerized to at least 99.7% conversion, as shown in Ingram, U.S. Pat. 3,274,133, does not allow chemical combination of the bromo-compound with the polystyrene, the following experiments were run.

A first experiment was run duplicating Example I of this application. The bromo-compound could not be found in the extract.

In a second experiment, styrene was polymerized in suspension to at least 99.7% conversion, as in Example I of U.S. Pat. 3,274,133. The polymer spheres thus formed were suspended in water containing tricalcium phosphate and sodium benzenesulfonate, as suspension stabilizers. After the addition of a mixture of 8.0% n-pentane blowing agent and 1.1% of pentabromochlorocyclohexane, the suspension was heated to 90°C for 5 hours to insure impregnation of the polymer particles. Extraction of the resulting polymer particles with a methanol-pentane mixture showed essentially all of the bromo-compound present in the extract.

From this it can be seen that the method suggested by Ingram, in U.S. Pat. 3,274,133, does not incorporate the bromo-compound into the polymer in an unextractable form. Since the method of this application does incorporate the bromo-compound into the polymer in a manner to render it unextractable, the two methods are seen to be fundamentally different.

What is claimed is:
1. A process for preparing self-extinguishing expandable polystyrene particles comprising the steps of:
   a. polymerizing styrene in an aqueous suspension in the presence of a catalytic amount of a free radical initiator until the polymerization has progressed to a point between about 92 and 98% conversion of monomer to polymer;
   b. adding a mixture consisting of from about 0.5 to 5.0% by weight based on styrene of pentabromochlorocyclohexane, 5 to 15% of a blowing agent, and 0.3 to 0.5% of free radical initiator;
   c. chemically incorporating the pentabromochlorocyclohexane into the growing polymer chains by completing the polymerization in aqueous suspension by heating the suspension under conditions of temperature and time sufficient to completely polymerize the remaining monomer; and
   d. recovering the polymer particles.

* * * * *